US006885672B1

(12) United States Patent
Tang et al.

(10) Patent No.: US 6,885,672 B1
(45) Date of Patent: Apr. 26, 2005

(54) SYSTEM AND METHOD FOR PROVISIONING VIRTUAL CIRCUIT ORDERS ON AN ASYNCHRONOUS TRANSFER MODE SUBNETWORK

(75) Inventors: Harry Tang, Atlanta, GA (US); Hanif Merali, Duluth, GA (US); M. Jeff Wilson, Duluth, GA (US); Asad Khan, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 1021 days.

(21) Appl. No.: 09/741,480

(22) Filed: Dec. 20, 2000

(Under 37 CFR 1.47)

(51) Int. Cl.⁷ .............................................. H04L 12/28
(52) U.S. Cl. .................... 370/412; 370/230.1; 370/235; 370/396; 709/223; 709/226; 709/232; 709/235; 710/29
(58) Field of Search ................................ 709/223, 226, 709/232, 235; 370/230.1, 235, 396, 412; 710/29

(56) References Cited

U.S. PATENT DOCUMENTS

| | | | | |
|---|---|---|---|---|
| 5,650,994 A | * | 7/1997 | Daley .......................... | 370/259 |
| 6,349,097 B1 | * | 2/2002 | Smith .......................... | 370/390 |
| 6,424,657 B1 | * | 7/2002 | Voit et al. .................... | 370/412 |
| 6,519,568 B1 | * | 2/2003 | Harvey et al. ................. | 705/1 |
| 6,611,867 B1 | * | 8/2003 | Bowman-Amuah ......... | 709/224 |
| 6,633,877 B1 | * | 10/2003 | Saigh et al. .................. | 707/10 |
| 6,742,015 B1 | * | 5/2004 | Bowman-Amuah ......... | 718/101 |

OTHER PUBLICATIONS

Lavia, A. and Rhynas, D.J., "Applications, Technologies, Architectures,and Protocols for Computer Communication", Proceedings of the sixth symposium on Data communications, ACM Press New York, NY, USA, 69–74, 1979.*

Levy, Eliezer and Silberschatz, Abraham, "Distributed file systems: concepts and examples", ACM Computing Surveys (CSUR), vol. 22 , Issue 4 (Dec. 1990), pp.: 321–374, ACM Press, Ny, NY,1990.*

Yuhua Chen; Turner, J.S.; "Dynamic queue assignment in a VC queue manager for gigabit ATM networks", ATM Workshop Proceedings, 1998 IEEE , May 26–29, 1998, pp. 3–10.*

Plotkin, N.T.; Varaiya, P.P.; "Performance analysis of parallel ATM connections for gigabit speed applications", INFOCOM '93, ProceedingsTwelfth Annual Joint Conference of the IEEE Computer and Communications Societies. Networking: Foundation for the Future. IEEE, Mar. 28–Apr. 1, 1993, pp. 1186–1193, vol. 3.*

* cited by examiner

Primary Examiner—Hosain Alam
Assistant Examiner—Shabama Qureshi
(74) Attorney, Agent, or Firm—Woodcock Washburn LLP

(57) ABSTRACT

A storage structure includes a plurality of sequentially arranged positions, each position for holding one order at a time. One of the positions is an end position from which an order is to be taken up for provisioning. Each order in a position moves to the next sequential position toward the end position, as the next sequential position becomes empty and available. The positions are organized into a first section and a second section. The first section is distal from the end position and includes at least one position. The first section receives orders from a first order delivery system into a receiving position. The second section is proximate to the end position and includes at least one position. The second section receives orders from a second order delivery system into a receiving position. If the second section cannot receive an order from the second order delivery system due to the receiving position thereof already holding an order, a pre-determined interval is observed prior to attempting to again receive the order. The pre-determined interval is selected to allow enough orders in the storage structure to be taken up and to allow the receiving position of the second section to become empty.

37 Claims, 3 Drawing Sheets

SYSTEM AND METHOD FOR PROVISIONING VIRTUAL CIRCUIT ORDERS ON AN ASYNCHRONOUS TRANSFER MODE SUBNETWORK

FIELD OF THE INVENTION

The present invention generally relates to the field of order provisioning. More particularly, the present invention relates to a system and method for provisioning virtual circuit orders on a telecommunications network.

BACKGROUND OF THE INVENTION

Today, many telecommunications users desire virtual circuits (VC) to allow high speed telecommunications. In particular, many Internet users desire digital subscriber loop access and multiplexing (DSLAM) circuits and asynchronous transfer mode (ATM) circuit to obtain high-speed Internet access. A DSLAM circuit connects a user to a communications network at a high speed data rate with digital communications. Typically, the DSLAM circuit physically extends between the user and a telephone network office near the user. An ATM circuit connects the DSLAM circuit with the network service provider over an ATM subnetwork. The circuit between the user and the network service provider is referred to as a VC and may be leased or reserved for the user for several hours, several days, or even several years.

Orders for VCs currently fall into two types, a bulk order and an individual order. A bulk order is an order that typically has been placed in advance but is not provisioned until the time the VC is desired. Typically, all bulk orders that are to be provisioned on a particular day are in fact provisioned on such day in a batch process, usually once a day. An individual order is an order that is typically placed at the same time the user desires the VC. An individual order may, for example, be taken over the phone or by way of a network such as the Internet and is immediately placed into a provisioning system through a graphical user interface (GUI) order entry system and may be referred to as GUI order.

In batch provisioning of bulk orders, each order for a VC is provisioned sequentially, one after the other, for example, beginning at a convenient time of the day (for example, midnight). However, and importantly, if too many bulk orders are placed in a batch for provisioning, or if a problem occurs in provisioning orders, orders at the end of the batch may not be processed for several hours, and may in fact still await provisioning at a less convenient time of the day (for example, during business hours). In such an instance, an individual/GUI order may be submitted for provisioning, but it may have to wait for all outstanding bulk orders to complete provisioning before such GUI order can be provisioned. Such wait may take an unacceptably long time, especially for an individual who desires to have his/her order provisioned within a relatively short period of time, such as an individual waiting on the aforementioned phone or waiting for a response over the aforementioned network.

Therefore, a need exists for a system and method for provisioning bulk orders and individual orders, wherein individual orders are provisioned relatively quickly, even if bulk orders from a batch still await provisioning.

SUMMARY OF THE PRESENT INVENTION

The present invention is directed to systems and methods for provisioning individual orders before the end of the batch provisioning, and minimizing bulk order timeouts. A two-section 'drop-down' buffer implements the provisioning flow control of both individual orders and bulk orders on a telecommunications network.

According to an aspect of the invention, a storage structure is provided for use in provisioning orders for virtual circuits (VCs). The storage structure includes a plurality of sequentially arranged positions, each position for holding one order at a time. One of the positions is an end position from which an order is to be taken up for provisioning. Each order in a position moves to the next sequential position toward the end position, as the next sequential position becomes empty and available. The positions are organized into a first section and a second section. The first section is distal from the end position and includes at least one position. The first section receives orders from a first order delivery system into a receiving position. The second section is proximate to the end position and includes at least one position. The second section receives orders from a second order delivery system into a receiving position. If the second section cannot receive an order from the second order delivery system due to the receiving position thereof already holding an order, a pre-determined interval is observed prior to attempting to again receive the order. The pre-determined interval is selected to allow enough orders in the storage structure to be taken up and to allow the receiving position of the second section to become empty.

Preferably, the invention is implemented on a telecommunications network. More preferably, the invention is implemented on an element management system, including individual orders and bulk orders for VCs on a telecommunications network. However, it is contemplated the present invention could be implemented on any order provisioning system containing both individual orders and bulk orders.

The above-listed features of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like references numerals represent similar elements throughout the several views of the drawings, and wherein.

DETAILED DESCRIPTION OF THE PREFERRED EMBODIMENTS

The present invention is directed to systems and methods for provisioning VC order requests on a telecommunications network. However, the present invention may be implemented with respect to any order provisioning system containing both bulk and individual order requests or the like in the manner discussed above without departing from the spirit and scope of the present invention.

Telecommunications Network

Figure 1:
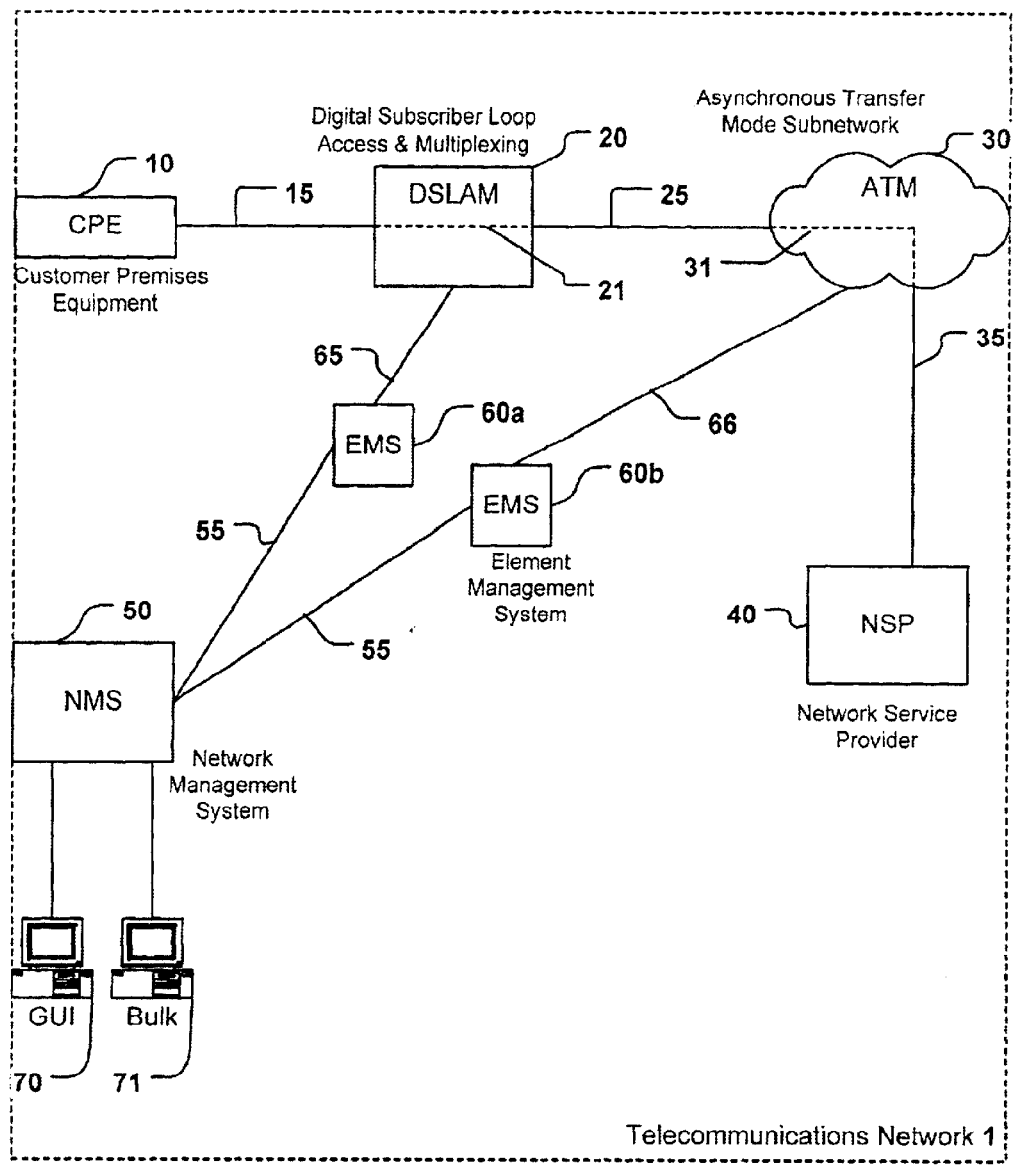
FIG. 1 is a block diagram of an exemplary telecommunications network.

Referring now to FIG. 1, an exemplary telecommunications network 1 is shown in accordance with one embodiment of the present invention. As seen, the telecommunications network 1 includes customer premises equipment (CPE) 10, a digital subscriber loop access and multiplexing (DSLAM) switch 20, an ATM subnetwork 30, a network service provider (NSP) 40, a network management system (NMS) 50, a GUI order entry system 70, a bulk order entry system 71, and several element management systems (EMS) 60a, 60b, at least one for each of the DSLAM device 20 and the ATM subnetwork 30.

CPE 10 may be any appropriate equipment, including but not limited to a telephone, a computer, a local area network, or a wide area network, for example. CPE 10 is connected to and communicates with a DSLAM 20 over a digital subscriber loop (DSL) 15. DSL 15 is a high speed digital data link allowing CPE 10 to access other devices within the telecommunications network 1.

DSL 15 may for example be an Asymmetric Digital Subscriber Loop (ADSL), although any particular DSL technology may be employed without departing from the spirit and scope of the invention. DSL is generally known to the relevant public and therefore need not be described herein in any detail.

At the DSLAM 20, which is typically at the aforementioned telephone network office, a DSLAM circuit 21 couples to the DSL 15 and facilitates an end to end connection between the NSP 40 and the CPE 10. The DSLAM 20 and the DSLAM circuit 21 are generally know to the relevant public and therefore need not be described herein in any detail. Accordingly, such DSLAM 20 and DSLAM circuit 21 may be any particular DSLAM 20 and DSLAM circuit 21 without departing from the spirit and scope of the present invention.

The DSLAM circuit 21 communicates with the ATM subnetwork 30 over a data link 25. Such ATM subnetwork 30 is an emerging packet switching network that couples the DSLAM circuit 21 and the NSP 40. The ATM subnetwork 30 implements an ATM circuit 31 for communication between the NSP 40 and the CPE 10. The ATM circuit 31 is coupled to data link 35 to facilitate connection to the NSP 40. As with the DSLAM 20 and DSLAM circuit 21, the data links 25, 35, the ATM subnetwork 30 and ATM circuit 31 are generally known or should be apparent to the relevant public and therefore need not be described herein in any detail. Thus, such data links 25, 35, ATM subnetwork 30 and ATM circuit 31 may be any particular data links 25, 35, ATM subnetwork 30 and ATM circuit 31 without departing from the spirit and scope of the present invention.

The NSP 40 provides access to a predetermined network such as the Internet. Once again, the NSP 40 is generally known to the relevant public and therefore need not be described herein in any detail. Thus, such NSP 40 may be any particular NSP 40 without departing from the spirit and scope of the present invention.

A VC is the entire circuit from the CPE 10 to the NSP 40 and allows the user at the CPE 10 to communicate, at high speed, to the NSP 40. The VC includes DSL 15, DSLAM circuit 21, data link 25, ATM circuit 31, and data link 35.

In order to implement a VC for a particular customer, the Network Management System (NMS) 50 receives VC orders from the GUI order entry system 70 and also from the bulk order entry system 71. GUI order entry system 70 may be any appropriate system for entering GUI orders, for example, a computer or Internet website. Bulk order entry system 71 likewise may be any appropriate system for entering bulk orders, for example, a computer or Internet web site.

An individual order as received by the NMS 50 from GUI order entry system 70 is typically provisioned immediately or at least in a matter of minutes. Bulk orders as received by the NMS 50 from the bulk order system 71 are received at various times, but are not provisioned until a predetermined batch provisioning time, as discussed above. Such batch provisioning causes many bulk orders to be continuously provisioned one after another. Still again, the NMS 50 is generally known to the relevant public and therefore need not be described herein in any detail. Thus such NMS 50 may be any particular NMS 50 without departing from the spirit and scope of the present invention.

As shown in FIG. 1, the NMS 50 is connected to element management systems (EMSs) 60a and 60b, and communicates with such EMSs 60a and 60b over data links 55. EMS 60b is connected to and communicates with the ATM subnetwork 30 over data link 65. EMS 60a is connected to and communicates with DSLAM 20 over data link 66. For each order as received by the NMS 50, be it individual or bulk, EMS 60b requests an ATM circuit 31 from the ATM subnetwork 30 in connection with such order, where the requested ATM circuit 31 is thereafter indefinitely dedicated to the CPE 10 of such order. Likewise, for each order received by the NMS 50, be it individual or bulk, EMS 60a requests a DSLAM circuit 21 from the DSLAM 20 in connection with such order, where the requested ATM circuit 31 is thereafter indefinitely dedicated to the CPE 10 of such order.

While one EMS 60a, 60b is shown for each of the DSLAM 20 and ATM subnetwork 30, it is to be recognized that multiple EMSs 60a, 60b may be provided for each element 20, 30 without departing from the spirit and scope of the present invention, each receiving orders from one or more NMSs 50. Again the EMSs 60a, 60b, are generally know to the relevant public and therefore need not be described herein in any detail. Thus, such EMSs 60a, 60b may be any particular EMSs 60a, 60b without departing from the spirit and scope of the present invention.

Thus, and as should be appreciated, each order received and provisioned at the NMS 50 is converted to an order for a DSLAM circuit 21 to be handled by a corresponding EMS 60a and to an order for an ATM circuit 31 to be handled by a corresponding EMS 60b. The EMSs 60a and 60b provision the respective orders, and then reply to the NMS 50. The NMS 50 and the EMSs 60a, 60b thus effectuate establishment of a continuous circuit between the CPE 10 and the NSP 40. To batch provision bulk orders, NMS 50 may send many bulk orders to the EMSs 60a and 60b. Typically, though, bulk orders are held at the NMS 50 until the predetermined batch provisioning time.

As was discussed above, in batch provisioning of bulk and individual/GUI orders, each order for a VC is provisioned sequentially, one after the other. Accordingly, if many bulk orders are submitted for and awaiting provisioning, a later-submitted GUI order must wait until all the bulk orders submitted before the GUI order are provisioned. Such wait may take an unacceptably long time, especially for an individual who desires to have his/her order provisioned within a few minutes.

To alleviate such situation, and in one embodiment of the present invention, each EMS 60a, 60b is provided ith a so-called 'drop-down' buffer designed to receive orders. Alternatively, a 'drop-down' buffer may be included in one of either EMS 60a or EMS 60b. In particular, each drop-down buffer is designed to allow GUI orders to be provisioned relatively quickly, even if several bulk orders still await provisioning by the EMS 60a, 60b.

Drop-down Buffer

Figure 2:
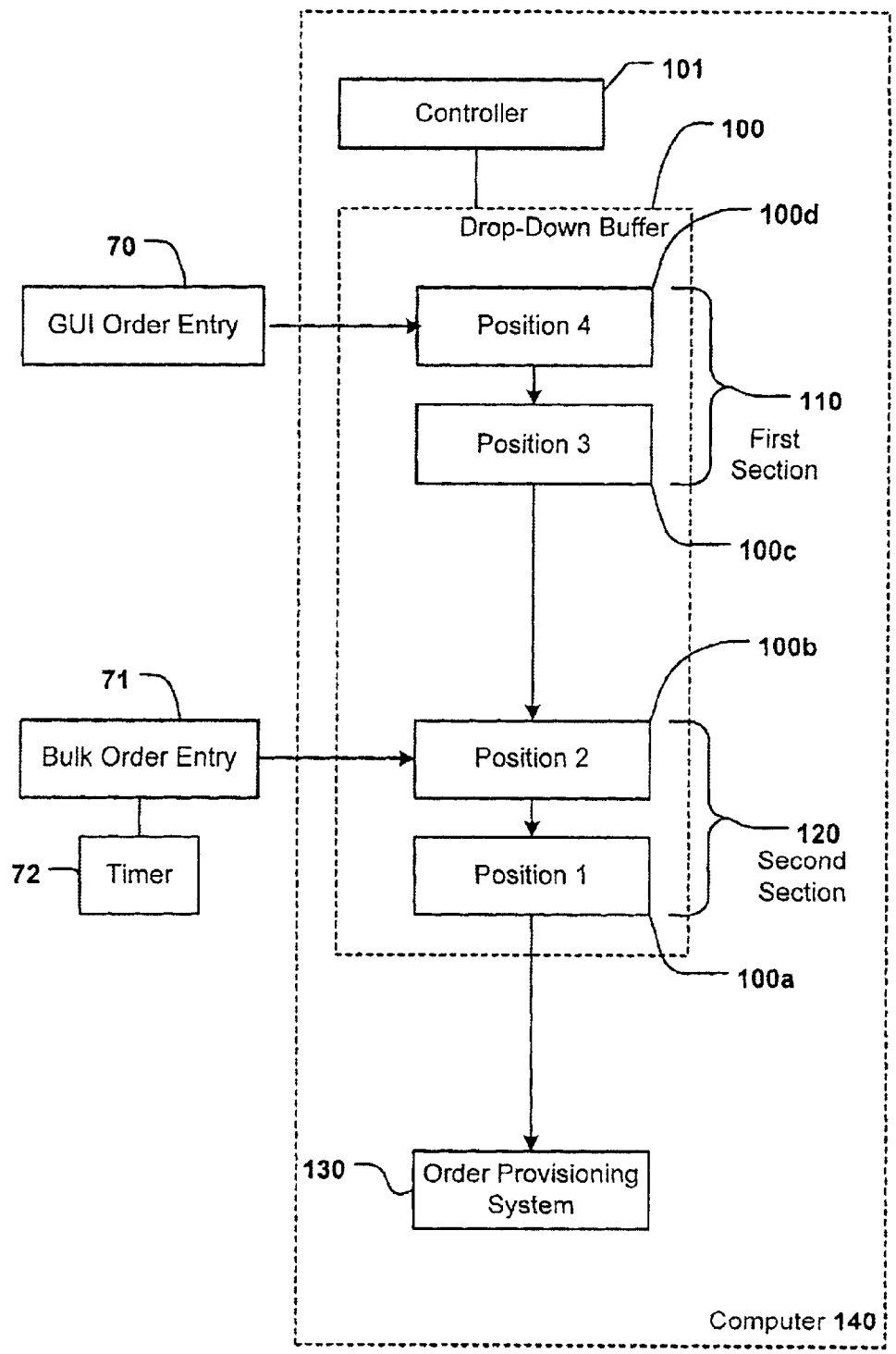
FIG. 2 is a block diagram of an exemplary drop-down buffer in accordance one embodiment of the present invention.

FIG. 2 is a diagram of an exemplary drop-down buffer 100 in accordance with one embodiment of the present invention. The exemplary drop-down buffer 100 is included in or coupled to each EMS 60a, 60b, or more generally, any order provisioning system 130, and thus assists in provisioning a VC in a telecommunications network 1 by metering orders to the EMS 60a, 60b or provisioning system 130. As may be appreciated, the drop-down buffer 100 and EMS 60a, 60b or provisioning system 130 may all reside on a computer 140 (shown), or may reside on separate computers 140, where each computer 140 may be any appropriate computer 140 without departing from the spirit and scope of the present invention.

As shown in FIG. 2, the drop-down buffer includes a first section 110 and a second section 120. Second section 120 includes a first position 100a, also referred to as an on-deck position, and a second position 100b. The first section 110 includes a third position 100c and a fourth position 100d. The positions with the first section 110 and the second section 120 are sequential. Importantly, in the drop down buffer 100, an order in the first or on-deck position 100a is next up or 'on-deck' for provisioning by the corresponding EMS 60a, 60b, and the on-deck position 100a becomes empty when the on-deck order is taken up by such EMS 60a, 60b. Also importantly, an order in an (n+1)th position moves or 'drops down' to an (n)th position whenever such (n)th position opens up.

Thus, if orders are in all four positions 100a–100d, and the on-deck order in the first position 100a is taken up, the order in the second position 100b drops down to the first position 100a to become the on-deck order, the order in the third position 100c drops down to the second position 100b, and the order in the fourth position 100d drops down to the third positions 100c. Similarly, if an order is received into the fourth position 100d of the buffer 100, an order is in the first position 100a, and the second and third positions 100b, 100c are empty, such received order immediately drops down to the second position 100b. Note that although each of the first and second sections 110, and 120 is shown having two positions, each section 110, 120 may include any number of positions greater than or equal to one, and each section 110, 120 may have a differing number of positions, all without departing from the spirit and scope of the present invention.

In the exemplary drop-down buffer 100 shown, first section 110 is adapted to receive GUI orders from the GUI order entry system 70 into the fourth position 100d, assuming such fourth position 100d is empty. For example, the GUI order entry system 70 may request that the drop-down buffer 100 receive a GUI order. If the fourth position 100d is empty (that is, if there are less than four orders already in the drop-down buffer 100), the drop-down buffer 100 receives the order into the fourth position 100d and allows the received order to drop down toward the on-deck position 100a, space permitting. If the fourth position 100d contains an order (that is, if there are four orders already in the buffer 100), the drop-down buffer 100 informs the GUI order entry system 70 that it cannot accept the order. The GUI order entry system retries until the fourth position 100d is empty and thus can receive the GUI order.

Also, in the exemplary drop-down buffer 100 shown, second section 120 is adapted to receive orders from the bulk order entry system 71 into the second position 100b, assuming such second position is empty. For example, the bulk order entry system 71 may request that the drop-down buffer 100 receive a bulk order. If the second position 100b is empty (that is, if there are less than two orders already in the buffer 100), the drop-down buffer 100 receives the order into the second position 100b and allows the received order to drop down towards the on-deck position, space permitting. If the second position 100b contains an order (that is, if there are two or more orders already in the buffer), the drop-down buffer 100 informs the bulk order entry system 71 that it cannot accept the order. The bulk order entry system 71 then waits for a pre-determined wait interval (e.g., 20 seconds) before again requesting that the drop-down buffer 100 receive the bulk order at the second position 100b.

Importantly, the wait interval is selected to effectively give any GUI orders present in the buffer 100 a sufficient amount of time to be cleared out of such buffer 100. Thus, the wait interval effectively gives such GUI orders in the buffer 100 a higher priority than a bulk order seeking admittance to the buffer, and such GUI orders thus need not wait for all bulk orders to provisioned. Preferably, if the second position 100b is filled, and GUI orders are present in the third position 100c or third and fourth positions 100c, 100d, the wait interval is long enough to allow a GUI order if present in the fourth position 100d to drop down to the first position 100a based on the three orders beneath being retrieved by the corresponding EMS 60a, 60b for provisioning during such wait interval. Of course, during the wait interval it is possible that additional GUI orders will be received into the first section 110.

At any rate, after the wait interval, the bulk order entry system 71 again requests that the drop-down buffer 100 receive the bulk order, and if the second position 100b is empty, the drop-down buffer 100 receives the order into the second position 100b and allows the received order to drop down to the on-deck position 100a, space permitting. If the second position 100b still contains an order after the wait interval, the drop-down buffer 100 informs the bulk order entry system 71 that it cannot accept the order, and the bulk order entry system 71 again waits the pre-determined wait interval before again requesting that the drop-down buffer receive the bulk order at the second position 100b. As may be appreciated, several cycles of wait intervals may be necessary before the bulk order is accepted, especially if many GUI orders are being received by the drop-down buffer 100 at the same time. Preferably, the end of the predetermined wait interval is determined by a timer 72 (FIG. 2).

As shown in FIG. 2, an order waiting in the first or on-deck position 100a is eventually communicated to an order provisioning system 130 (i.e., an EMS 60a, 60b). The process of communicating such order is generally known or should be apparent to the relevant public and therefore need not be described herein in any detail. Generally, any process for communicating the order may be employed without departing from the spirit and scope of the present invention. For example, the order provisioning system 130 may request an order from the drop-down buffer 100, or alternatively, the drop-down buffer may request that the order provisioning system receive an order.

In either case, the order provisioning system 130 receives an order from the buffer 100 and provisions the order to the DSLAM 20, the ATM subnetwork 30, or otherwise, as the case may be. Thereafter, the order provisioning system 130 is ready to provision the next order from the buffer 100 (in the on-deck position 100a), and the process continues anew.

As shown in FIG. 2, the computer 140 may include a controller 101. The controller 101 monitors the drop-down buffer 100 and provides the intelligence for the drop-down buffer 100 to coordinate with the GUI order entry system 70, the bulk order entry system 71, and the order provisioning system 130. For example, controller 101 may monitor the positions of the drop-down buffer 100 to determine if the position is empty or if the position holds an order. The controller 101 may coordinate the "dropping down" of orders to the next sequential position. The controller 101 may coordinate the receipt of orders from the GUI order entry system 70 and the bulk order entry system 71, placing orders in empty positions, rather than positions already including orders. The controller may coordinate the sending of orders to the order provisioning system 130, the taking of an order from the on-deck position and/or the sending of the order to the order provisioning system 130. As may be appreciated, the functionality of such controller 101 may alternately be included within the drop-down buffer 100, the GUI order entry system 70, the bulk order entry system 71, and/or the order provisioning system 130. Such controller 101 and the functionality thereof is generally known or should be apparent to the relevant public and therefore need not be disclosed herein in any further detail.

Figure 3:
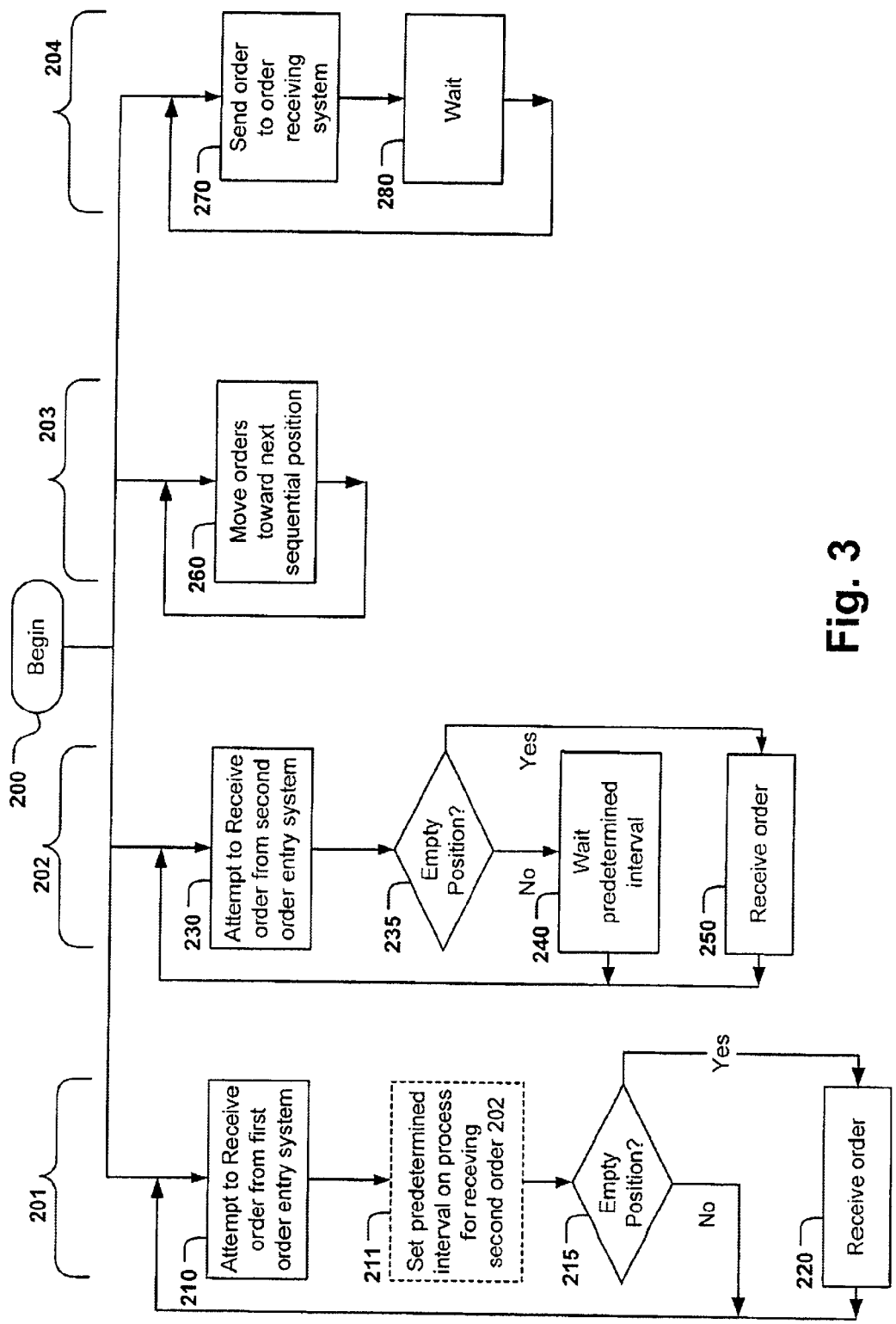
FIG. 3 is a flow chart of showing methods performed in the course of operating the buffer in accordance with one embodiment of the present invention.

FIG. 3 is a flow chart of an exemplary method of the present invention. As shown in FIG. 3, the method begins at step 200 and includes a process for receiving a first (individual) order 201, a process for receiving a second (bulk) order 202, a process for moving orders to the next sequential position 203, and a process for sending orders to an order receiving system 204.

The process for receiving a first order 201 includes attempting to receive an (individual) order from the first order entry system 70 as shown in FIG. 1 into the drop down buffer 100 as shown in FIG. 2, as shown at step 210. A request that the drop-down buffer 100 receive the order is made, and at step 215, the drop-down buffer 100 determines if the fourth position 100*d* of the first section 110 is empty. As shown in step 220, if empty, the drop-down buffer 100 receives the order into such fourth position 100*d*. If not empty, the drop-down buffer 100 again attempts to receive the order perhaps after a short period of time, as shown in step 210.

Optionally, at step 211, a predetermined wait interval is set on process 202, receiving a second order. In this manner, the process for receiving a second order 202 .waits a predetermined interval before attempting to receive an order from the second order delivery system. Step 211 may be included alternatively or additionally to step 240, which is described in more detail below.

The process for receiving a second order 202 includes attempting to receive an (bulk) order from the second order entry system 71 as shown in FIG. 1 into the drop down buffer 100 as shown in FIG. 2), as shown at step 230. A request that the drop-down buffer 100 receive the order is made, and at step 235, the drop-down buffer 100 determines if the second position 100*b* of the second section 120 is empty. As shown in step 250, if empty, the drop-down buffer 100 receives the order into the such second position 100*b*. If not empty, the drop-down buffer 100 waits for a predetermined interval, as shown in step 240. Preferably, the predetermined interval is selected so that orders in the first section can be provisioned before returning to step 230.

The process for moving orders to the next sequential position 203 includes moving orders toward the next sequential position towards the end position, shown at step 260. An order in an (n+1)th position moves or 'drops down' to an (n)th position whenever such (n)th position opens up, as was discussed above.

The process for sending an order to the order receiving system 204 includes sending an order to the order provisioning system at step 270. The order provisioning system 130 may request an order from the drop-down buffer 100 when available to receive and provision an order, or alternatively, the drop-down buffer 100 may request that the order provisioning system 130 receive an order when there is an order in the end position 100*a* of the drop-down buffer 100. At step 280, the drop-down buffer 100 waits. The drop-down buffer 100 may wait until there is another order in the end position 100*a* or the drop-down buffer 100 may wait until the order provisioning system 130 requests another order. After completion of step 280, the drop-down buffer 100 returns to step 270 and again attempts to send an order to the order provisioning system 130.

In order to control the drop-down buffer 100, such buffer 100 may be provided with an appropriate controller (not shown). The details of such controller are generally known or should be apparent to the relevant public and therefore need not be discussed herein in any detail. Accordingly, any appropriate controller may be employed without departing from the spirit and scope of the present invention.

It should be appreciated that the present invention is not limited to provisioning orders on a DSLAM 20 or an ATM subnetwork 30. Instead, the present invention may apply to provisioning any orders on any order provisioning system that includes both individual/GUI orders or the like and bulk orders or the like, wherein each individual order is to be given the opportunity to be provisioned ahead of waiting bulk orders.

The present invention may be embodied in the form of appropriate computer software or in the form of appropriate hardware or a combination of appropriate hardware and software without departing from the spirit and scope of the present invention. Further details regarding such hardware and/or software should be apparent to the relevant public. Accordingly, further descriptions of such hardware and/or software herein are not believed to be necessary.

In the present invention, a system and method are provided to provision bulk orders and individual orders, wherein individual orders are provisioned relatively quickly, even if bulk orders from a batch still await provisioning. It is to be understood that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A storage structure implemented on a computer for buffering orders to be provisioned, the storage structure comprising:

a plurality of sequentially arranged positions, each position for holding one order at a time, one of the positions being an end position from which an order therein is to be taken up for provisioning, each order in a position being moved to the next sequential position toward the end position as such next sequential position becomes empty and available, the positions being organized into:

a first section distal from the end position and including at least one position, the first section for receiving orders from a first order delivery system into a receiving one of the positions thereof; and a second section proximate to the end position and including at least one position, the second section for receiving orders from a second order delivery system into a receiving one of the positions thereof;

wherein one of either attempting to receive an order from the second order delivery system while the second section cannot receive the order due to the receiving position thereof already holding an order and attempting to receive an order from the first order deliver system, triggers observing a pre-determined interval prior to attempting to again receive the order.

2. The storage structure of claim 1 wherein the pre-determined interval is selected to allow enough orders in the storage structure to be taken up such that the receiving position of the second section becomes empty.

3. The storage structure of claim 1 wherein the first section includes two sequential positions.

4. The storage structure of claim 1 wherein the second section includes two sequential positions.

5. The storage structure of claim 1 in combination with the first order delivery system, the first order delivery system being an individual order entry system for entering and forwarding an individual order to be provisioned upon forwarding.

6. The storage structure of claim 1 in combination with the second order delivery system, the second order delivery system being a bulk order entry system for entering and forwarding a bulk order to be provisioned along with other bulk orders in a batch process.

7. The storage structure of claim 1 in combination with the first order delivery system, the first order delivery system being a bulk order entry system for entering and forwarding a bulk order to be provisioned along with other bulk orders in a batch process.

8. The storage structure of claim 1 in combination with the second order delivery system, the second order delivery system being an individual order entry system for entering and forwarding an individual order to be provisioned upon forwarding.

9. The storage structure of claim 1 in combination with an order provisioning system, the order provisioning system being an element management system for taking up an order from the end position for provisioning.

10. The storage structure of claim 9 in combination with an asynchronous transfer mode subnetwork, the element management system being connected to and communicating with the asynchronous transfer mode subnetwork, the asynchronous transfer mode subnetwork for provisioning an asynchronous transfer mode circuit corresponding to the order taken up by the element management system.

11. The storage structure of claim 9 in combination with an digital subscriber and multiplexing (DSLAM) switch, the element management system being connected to and communicating with the DSLAM switch, the DSLAM switch for provisioning a DSLAM circuit corresponding to the order taken up by the element management system.

12. The storage structure of claim 1 in combination with a timer, the predetermined interval being governed by the timer.

13. A computer having a storage structure implemented thereon for buffering orders to be provisioned, the storage structure comprising:

a plurality of sequentially arranged positions, each position for holding one order at a time, one of the positions being an end position from which an order therein is to be taken up for provisioning, each order in a position being moved to the next sequential position toward the end position as such next sequential position becomes empty and available, the positions being organized into:

a first section distal from the end position and including at least one position, the first section for receiving orders from a first order delivery system into a receiving one of the positions thereof; and a second section proximate to the end position and including at least one position, the second section for receiving orders from a second order delivery system into a receiving one of the positions thereof;

wherein one of either attempting to receive an order from the second order delivery system while the second section cannot receive the order due to the receiving position thereof already holding an order and attempting to receive an order from the first order deliver system, triggers observing a pre-determined interval prior to attempting to again receive the order.

14. The computer of claim 13 wherein the pre-determined interval is selected to allow enough orders in the storage structure to be taken up such that the receiving position of the second section becomes empty.

15. The computer of claim 13 wherein the first section includes two sequential positions.

16. The computer of claim 13 wherein the second section includes two sequential positions.

17. The computer of claim 13 in combination with the first order delivery system, the first order delivery system being an individual order entry system for entering and forwarding an individual order to be provisioned upon forwarding.

18. The computer of claim 13 in combination with the second order delivery system, the second order delivery system being a bulk order entry system for entering and forwarding a bulk order to be provisioned along with other bulk orders in a batch process.

19. The computer of claim 13 in combination with the first order delivery system, the first order delivery system being a bulk order entry system for entering and forwarding a bulk order to be provisioned along with other bulk orders in a batch process.

20. The computer of claim 13 in combination with the second order delivery system, the second order delivery system being an individual order entry system for entering and forwarding an individual order to be provisioned upon forwarding.

21. The computer of claim 13 further comprising an order provisioning system, the order provisioning system being an element management system for taking up an order from the end position for provisioning.

22. The computer of claim 21 in combination with an asynchronous transfer mode subnetwork, the element management system being connected to and communicating with the asynchronous transfer mode subnetwork, the asynchronous transfer mode subnetwork for provisioning an asynchronous transfer mode circuit corresponding to the order taken up by the element management system.

23. The computer of claim 21 in combination with an digital subscriber and multiplexing (DSLAM) switch, the element management system being connected to and communicating with the DSLAM switch, the DSLAM switch for provisioning a DSLAM circuit corresponding to the order taken up by the element management system.

24. The computer of claim 21 in combination with a timer, the predetermined interval being governed by the timer.

25. The computer of claim 21 further comprising a controller for monitoring and controlling the plurality of sequentially arranged positions, the first order delivery system, the second order delivery system, and the order provisioning system.

26. A method of provisioning orders received from a first order entry system and a second order entry system, the method employing a storage structure implemented on a computer for buffering orders to be provisioned, the storage structure comprising a plurality of sequentially arranged positions, each position for holding one order at a time, one of the positions being an end position from which an order therein is to be taken up for provisioning, each order in a position being moved to the next sequential position toward the end position as such next sequential position becomes empty and available, the positions being organized into: a first section distal from the end position and including at least one position, and a second section proximate to the end position and including at least one position, the method comprising:

receiving orders from the first order delivery system into a receiving one of the positions of the first section;

receiving orders from a second order delivery system into a receiving one of the positions of the second section;

observing a predetermined interval if one of either the second section cannot receive an order from the second order delivery system due to the receiving position thereof already holding an order and attempting to receive an order from the first order deliver system; and attempting to again receive the order after the predetermined interval is observed.

27. The method of claim 26 wherein the pre-determined interval being selected to allow enough orders in the storage structure to be taken up such that the receiving position of the second section becomes empty.

28. The method of claim 26 further comprising entering and forwarding an individual order into the first order delivery system, the individual order to be provisioned upon forwarding.

29. The method of claim 26 further comprising entering and forwarding a bulk order into the second order delivery system, the bulk order to be provisioned along with other bulk orders in a batch process.

30. The method of claim 26 further comprising entering and forwarding a bulk order into the first order delivery system, the bulk order to be provisioned along with other bulk orders in a batch process.

31. The method of claim 26 further comprising entering and forwarding an individual order into the second order delivery system, the individual order to be provisioned upon forwarding.

32. The method of claim 26 further comprising taking up an order from the end position into an order provisioning system for provisioning of the order.

33. The method of claim 32 wherein taking up an order from the end position into an order provisioning system for provisioning of the order further comprises taking up an order from the end position into an order provisioning system, the order provisioning system being an element management system.

34. The method of claim 32 wherein taking up an order from the end position into an order provisioning system for provisioning of the order further comprises taking up an order from the end position into an order provisioning system, the order provisioning system being an element management system for provisioning an asynchronous transfer mode circuit on a asynchronous transfer mode subnetwork.

35. The method of claim 32 wherein taking up an order from the end position into an order provisioning system for provisioning of the order further comprises taking up an order from the end position into an order provisioning system, the order provisioning system being an element management system for provisioning a digital subscriber and multiplexing (DSLAM) circuit on a DSLAM switch.

36. The method of claim 26 wherein observing a predetermined interval if the second section cannot receive an order from the second order delivery system due to the receiving position thereof already holding an order further comprises observing a predetermined interval governed by a timer if the second section cannot receive an order from the second order delivery system due to the receiving position thereof already holding an order.

37. The method of claim 26 further comprising moving each order in a position to the next sequential position toward the end position as such next sequential position becomes empty and available.

* * * * *